Feb. 26, 1952   C. H. DUNNING ET AL   2,587,123
FILM ADVANCING MECHANISM IN SLIDE FILM PROJECTORS
Filed June 29, 1948   2 SHEETS—SHEET 2
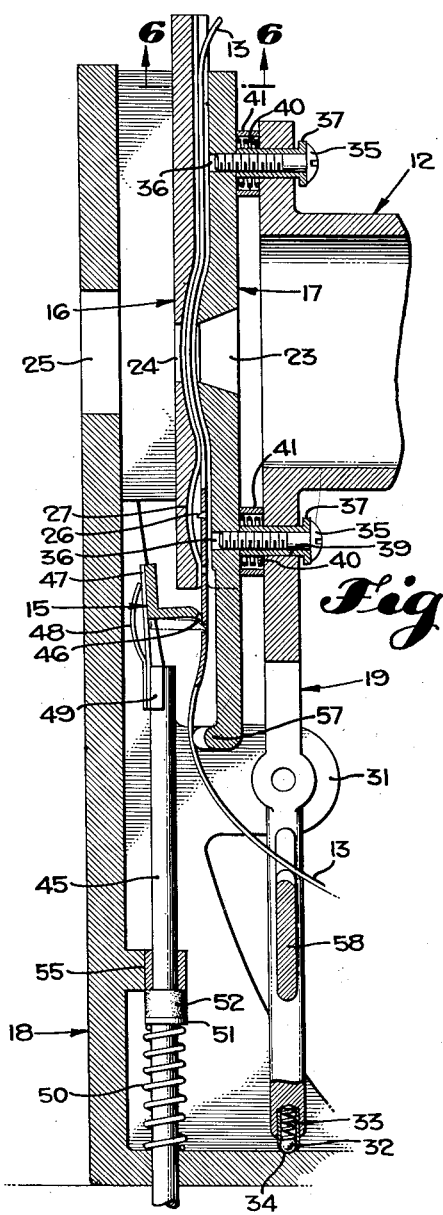
CARROLL H. DUNNING
CARROLL DODGE DUNNING
INVENTORS
BY Robert O. Fulwider
ATTORNEY Patented Feb. 26, 1952

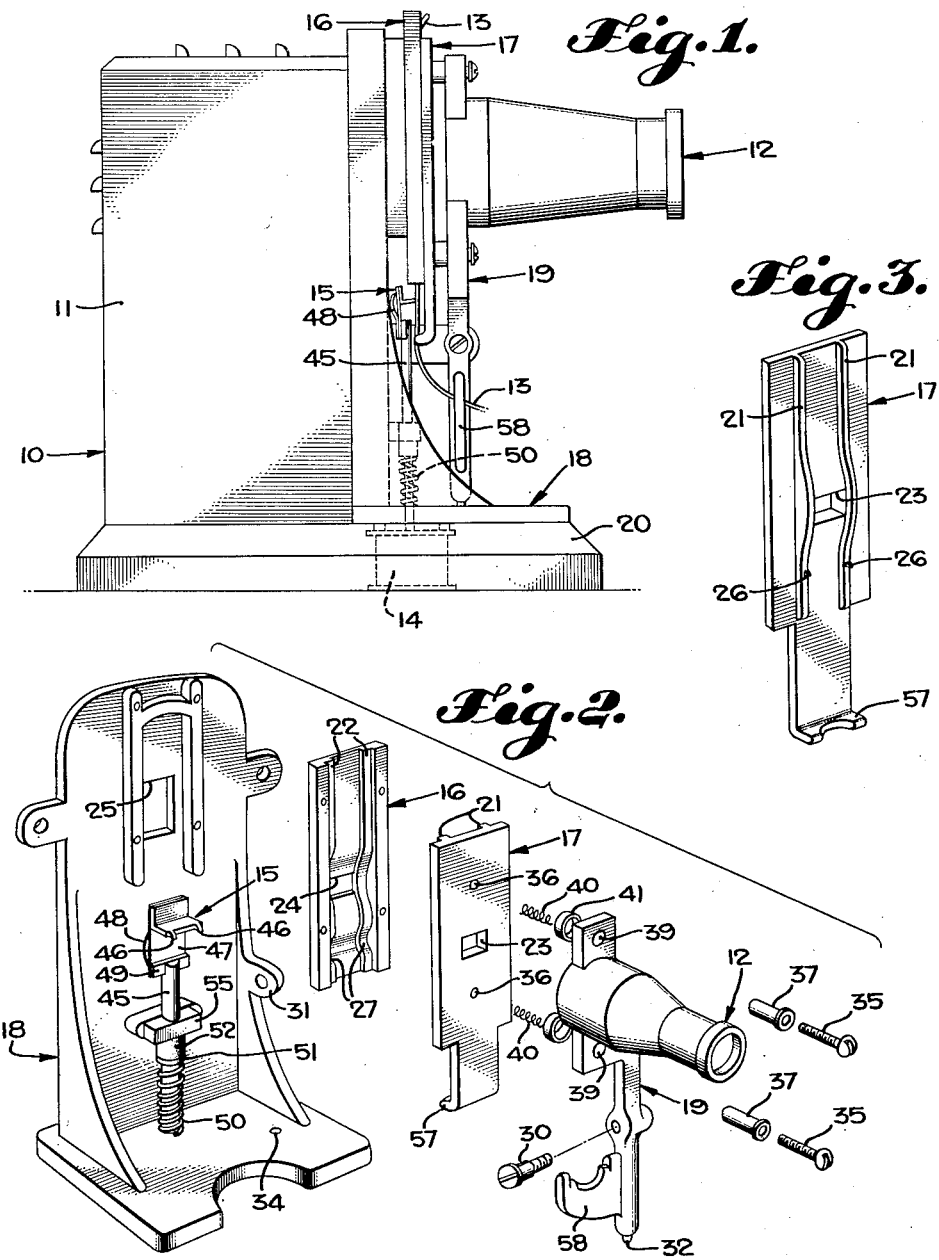

2,587,123

UNITED STATES PATENT OFFICE 2,587,123

FILM ADVANCING MECHANISM IN SLIDE FILM PROJECTORS

Carroll H. Dunning and Carroll Dodge Dunning, Los Angeles, Calif., assignors to Dunning Color Corporation, Los Angeles, Calif., a corporation of California Application June 29, 1948, Serial No. 35,864

2 Claims. (Cl. 88—28)

Our invention relates generally to apparatus for moving strip film past an optical aperture, as for example, the film advancing mechanisms of motion picture projectors, cameras, optical printers, and the like. More particularly, our invention relates to a slide film projector which is adapted to project a series of sequentially arranged slides or still pictures on a continuous loop of film.

Slide film projectors of the type just described are often used in illustrating lectures, presenting advertising messages, presenting educational information, etc. Usually the film employed in such devices is of the edge-perforated motion picture type, the perforations in the film being used to advance the same from one picture position to the next and also to locate the picture in the optical aperture of the projector. Sometimes a shutter is employed in such devices, the shutter being interposed in the optical system during the time that the film is being advanced. Usually, however, such a shutter is not employed in projectors adapted to project "stills" but the film is merely advanced, creating a somewhat objectionable impression as the image on the projection screen moves vertically during the advancing of the film.

It has been suggested that the objectionable feature of the moving image on the screen can be avoided without the use of a shutter if the film is very rapidly advanced. Mechanisms for rapidly advancing film have, in the past, however, had the disadvantage that they often tend to tear out the sprocket holes or perforations in the film due to the high stresses that obtain when the film is accelerated from a standing start.

In addition to avoiding the moving image effect just described, another desirable feature in slide film projectors is accurate positioning of each successive frame. One reason for desiring extremely accurate positioning of successive pictures is that in educational films and advertising films of the type previously mentioned, it is often desirable to create semi-animation effects by repeating substantially the same picture on successive frames, adding to succeeding pictures, however, printed title material or possibly some feature of the picture which it is desired to emphasize.

Another reason for desiring accurate positioning of successive frames is that it is sometimes desirable to leave a certain picture in a series on the screen for a relatively long time, as compared to other pictures. If a single frame is left in a slide film gate for any substantial time, the heat of the projection lamp may tend to melt, burn or otherwise destroy the film. Such destruction of the film can be avoided, however, if the identical picture is repeated on two or more successive frames and the film periodically advanced so as to avoid leaving any particular area thereof in the optical path for an excessive length of time. Such a series of identical pictures can be used, however, only if each is accurately positioned with respect to the sprocket holes, and furthermore, only if the film is very rapidly advanced and accurately positioned in the gate at each advance thereof.

Bearing in mind the foregoing characteristics of previous projectors of the class described, and the desirable features to be obtained therein, it is a major object of our invention to provide a slide film projector which is adapted to automatically project a series of still pictures from a continuous loop of motion picture type film.

Another object of our invention is to provide a slide film projector of the class described which is so constructed as to obviate the necessity of a shutter to be used between successive projected pictures.

Still another object of our invention is to provide film advancing mechanism in a projector of the class described which is adapted to accurately position successive frames of said film.

A further object of our invention is to provide a projector of the class described having advancing mechanism therein which is adapted to prevent tearing of the film sprocket holes while rapidly advancing said film.

A still further object of our invention is to provide a projector of the class described which has relatively few working parts.

Yet another object of our invention is to provide a slide film projector of the class described having a solenoid operated film advancing mechanism and an electric circuit in conjunction with said solenoid to effect relatively fast operation thereof.

The foregoing and other objects of our invention will be apparent from a consideration of the following detailed description of a slide film projector embodying the invention, such consideration being given also to the attached drawings, in which:

Figure 1 is a side elevational view of a slide film projector embodying the present invention;

Figure 2 is a perspective, exploded view of parts of the film carrying and advancing mechanism employed in the projector illustrated in Figure 1;

Figure 3 is a perspective view of a movable film gate employed in the mechanism illustrated in Figure 2;

Figure 4 is an enlarged fragmentary elevational section taken on a medial vertical plane through the film carrying and advancing mechanism of the projector illustrated in Figure 1, the film being shown in its motionless or "projecting" position;

Figure 5 is an enlarged elevational section similar to Figure 4, showing the position of parts during the advancing of the film from one picture position to the next;

Figure 6 is a horizontal section taken on the line 6—6 in Figure 4;

Figure 7 is a semi-schematic diagram illustrating the motion of the film from one picture position to the next; and Figure 8 is a wiring diagram of the circuit employed in connection with the solenoid embodied in the projector of Figure 1.

Referring first to Figure 1 for a general description of the slide film projector embodying our invention, it will be seen that we have designated the device in toto by the reference character 10, the projector including a conventional lamp housing 11, a projecting lens 12 positioned and adapted to focus on successive pictures on a continuous loop of film 13, said film being advanced periodically through the action of a solenoid 14 which operates a pull-down claw member 15. The film 13 is accurately spaced from the projection lens 12, being held between a fixed aperture plate 16 and a relatively movable gate member 17 which is spring urged toward the aperture plate 16 whereby to hold the film for sliding motion between said members. The entire film carrying and advancing mechanism is mounted on an angle shaped chassis 18 which in turn is secured to a base member 20 of the projector 10.

In order to accurately position the film with respect to the projection lens 12, and to prevent undesirable warping or flexion thereof along a curve transverse to its longitudinal length, the film is carried between the aperture plate 16 and the gate 17 on opposed pairs of rails 21 and 22 formed in the gate and aperture plate, respectively. As can be seen from an examination of Figures 2 and 3, the opposed rails 21 and 22 are complementally curved out of a vertical plane, such curvature being concave towards the projection lens 12. The amount of curvature is such as to improve the optical characteristics of a conventional projection lens by compensating slightly for spherical aberration therein, and further serves to prevent flexure of the film in a transverse direction.

Aligned apertures 23 in the gate, 24 in the aperture plate, and 25 in the chassis 18 permit the passage of light through the film for purposes of projecting the pictures thereon. The picture image on the film is framed by the foremost aperture 23 in the gate 17, the latter aperture being slightly smaller than the others.

Integrally formed in the gate 17 immediately below the aperture 23 therein is a pair of ratchet-tooth shaped indexing claws 26 which serve to vertically position the film with respect to the aperture 23 during the stationary period of the film, as will hereinafter be described. During the stationary period of the film, the index claws 26 enter perforations therein and during advancing of the film from one frame to the next, it is desired that the film slide over the claws 26 and to this end a pair of recesses 27 are formed in the rails 22 of the aperture plate 16, the recesses 27 being directly opposite the indexing claws 26, thus permitting the film to bow rearwardly to disengage the index claws 26.

The gate member 17 is spring mounted with respect to the aperture plate 16, being urged toward the same whereby to hold the film in intimate and sliding engagement with the rails 21 and 22. For purposes of loading the film into the projector, it is also desirable that the gate member 17 be movable away from the aperture plate 16 so that the film may be readily placed between the last two members. For these purposes, the gate 17 is spring mounted to a pivotable lens mounting member 19, which in turn is secured by a shouldered pivot screw 30 to a suitably positioned lug 31 formed in the chassis 18.

The lower end of the lens supporting member 19 projects downwardly to a point adjacent the lower horizontal surface of the chassis 18 and carries in said lower end a detent comprising a movable ball 32 downwardly urged by a compression spring 33 into a depression 34 formed in the horizontal surface of the chassis 18. Thus the lens supporting member 19 is normally held in the vertical position illustrated in Figure 1, but may be rotated clockwise about the pivot screw 30 moving the gate member 17 carried thereby in a clockwise direction away from the aperture plate 16.

The securing means holding the gate member 17 to the lens mounting member 19 includes a pair of screws 35 threaded into holes 36 in the gate 17, a pair of sleeves 37 surrounding the screws 35 and slidably mounted in suitable apertures 39 in the lens supporting member 19. A pair of compression springs 40 are positioned between the lens supporting member 19 and the gate 17, each spring 40 surrounding one of the sleeves 37. Tubular spacers 41 surrounding the springs 40 limit the outward motion of the gate 17.

Thus, as the lens carrying member 19 is swung in a counter-clockwise direction to clamp the film between the gate 17 and the aperture plate 16, the springs 40 are slightly compressed, raising the outer shoulders on the sleeves 37 slightly above the surface of the lens mounting member 19 in which they are slidably carried. Accordingly, constant pressure is exerted against the film, holding the same in the aforementioned curved condition. From an examination of Figure 6, it will be seen that the film engaging surfaces are confined to the perforated edges of the film, thus to avoid scratching the image surface.

For a description of the film advancing mechanism employed herein, reference should now be had to Figures 4 and 5. Here it will be seen that the film is advanced by a claw member 15 which is mounted to the upper end of a vertical actuating rod 45, being reciprocally movable from an upper limiting position illustrated in Figure 4, to a lower limiting position illustrated in Fig. 5, and vice versa. During projection periods, when the film 13 remains stationary in the carrying members 16 and 17, the claw member 15 remains in its uppermost position as illustrated in Figure 4. When it is desired to advance the film to the next frame therein, the solenoid 14 is momentarily energized, pulling downwardly on the actuating rod 45 and claw member 15, which in turn engages the film by means of a pair of ratchet shaped teeth 46, and pulls the film downwardly until the member 15 reaches a lower limited position, as shown in Figure 5.

It will be noted that the claw member 15 is not rigidly secured to the upper end of the actuating rod 45 but is spring mounted thereto. Such spring mounting comprises a pair of leaf springs 47 and 48 secured at their lower ends to the actuating rod 45 by a T-like member 49. The forward leaf spring 47 is secured at its upper end to the claw member 15 and the rearmost member is bowed somewhat to resiliently resist rearward swinging movement of the claw member 15.

By reason of the fact that the point of engagement of the teeth 46 with the film 13 is somewhat forward of the supporting spring 47, the claw member 15 tends to bend upwardly somewhat, as indicated in Figure 4, due to the reactive force of the film when the teeth 46 first engage the same. As the film is accelerated from its stationary position, however, the resilient forces in the springs 47 and 48 again move the claw member 15 to its normal horizontal position, as indicated in Figure 5. The result of this initial bending of the spring 47 is to prevent extreme stresses due to the first shock of engagement of the teeth 46 with the perforations in the film 13 and thus avoids tearing of the film.

The reciprocal action of the actuating rod 45 is produced by means of a compression spring 50 which opposes the force of the solenoid 14. Thus when, after a momentary energization of the solenoid to pull the claw member 15 downwardly, the solenoid is de-energized, the spring 50 thrusting upwardly against an abutment 51 fixed to the actuating shaft 45 returns the latter to its initial position, illustrated in Figure 4. A rubber or other resilient bumper member 52 cushions the shock of the returning actuating rod 45 by striking against a slide bearing 55 formed in the chassis 18.

As the actuating rod 45 starts to move upwardly from the position shown in Figure 5, the teeth 46 being engaged with perforations in the film 13, start to move the latter upwardly until a pair of opposite perforations therein engage the index claws 26. The relative position of the claw member 15 and the index claws 26 is such that the film moves upwardly only a slight amount to bring the perforations of the film 13 into said engagement with the index claws 26. Thereafter, due to the downwardly slanting upper surfaces of the teeth 46, the member 15 disengages from the film 13. This disengagement is permitted by slight rearward bending of the spring mountings 47 and 48 and a forward bowing of the film 13. To permit the forward bowing of the film 13, as just described, the latter is supported in a free span over a distance from the lower end of the aperture plate 16 to a guide member 57 formed in a downward extension of the film gate 17. An additional guide member 58 is formed in the lens supporting member 19 whereby to guide the film forwardly out of the film carrying mechanism. Both the guide members 57 and 58 are centrally relieved to prevent scratching of the picture image area on the film.

It will be noted from Figure 4 that when the claw member 15 is in its uppermost or "rest" position, the teeth 46 are not engaged with the film but are immediately above a pair of perforations therein. Thus, the actuating member 45 starts to move and moves a short distance before the film is picked up by the teeth 46 and moved downwardly to advance to the next picture frame. This permits the relatively massive members, such as the actuating rod 45, the armature in the solenoid and the claw member 15 to "come up to speed," before picking up and moving the film.

In Figure 7, the motion of a particular picture image on the film 13 is illustrated. Here three successive positions of the film are indicated, being identified by the reference characters 60, 61 and 62, respectively. In the initial position 60, the film is in its stationary or "projecting" position, a picture image 63 being framed by the aperture 65. In the second position 61, the film position corresponding to the lowermost position of the claw member 15 is illustrated and it will be seen that the next successive picture image 64 has been moved to a position slightly below the aperture 65. In the third position 62, the film has been moved upwardly slightly to bring the perforations into engagement with the index claws 26, and it will be seen that the picture image 64 is properly aligned with the aperture 65.

One of the well-known characteristics of magnetic devices, such as the solenoid 14, is that the electrical power requirement is relatively great at the beginning of the motion of the armature to produce a given mechanical thrust, than is required near the end of the armature stroke when the magnetic path is considerably reduced. It is also a fact that coils of the type employed in solenoids can withstand a relatively great electrical overload for a short period without damaging effects. Thus, if it is desired to obtain maximum mechanical thrust from a solenoid without damaging the coil therein due to excessive current flow, it is desirable that the initial electrical voltage applied to the coil be relatively great and that this voltage be reduced as the armature moves.

We have found that this desirable characteristic can be achieved be energizing the solenoid 14 by discharging a condenser therethrough. Thus, a condenser may be charged to a voltage considerably above the continuous duty voltage of said solenoid and which would burn out the solenoid coil if applied for any appreciable length of time and this condenser discharged through the solenoid coil without damaging the same, due to the fact that the condenser voltage drops off as it discharges.

This particular type of action is achieved in the present instance by means of a circuit illustrated in Figure 8, wherein a conventional half-wave rectifier of the copper oxide or other well known type is indicated by the reference character 70, and is connected through a single-pole two-position switch 71 to charge a condenser 72 from an alternating current power source connected to the leads 73 and 74. The switch 71 is periodically operated by means of a clockwork mechanism 75 to momentarily close the movable contact 76 against one fixed contact 77, at the same time breaking the electrical connection with the other fixed contact 78. The effect of such momentary operation of the switch 71 is to disconnect the condenser 72 from the source of charging voltage and connect the condenser across the solenoid coil 79, whereby to actuate the solenoid. The effect of this arrangement is to balance the normally decreasing voltage of a discharging condenser against the normally increasing mechanical force of a solenoid whereby to produce a strong, relatively uniform impulse in the solenoid. The voltage of the supply source connected to the leads 73 and 74 can be many times greater than the voltage which could be continuously applied to the solenoid coil 79.

While the particular circuit illustrated herein is actuated automatically by the clockwork mechanism 75, it is sometimes desirable to manually advance the film, as, for example, when a speaker is illustrating his lecture with slides, he will wish to advance the slide each time a certain point in the lecture is reached. For this purpose, a solenoid (not shown) can be substituted for the clockwork mechanism 75 and the solenoid energized at will from a point remote from the projector. Still another alternate method of actuating the solenoid coil 79 is to extend the leads to the contacts 76, 77 and 78, locating the switch 71 at a point remote from the projector and actuating the same at will.

While the slide projector shown and described herein is fully capable of achieving the objects and providing the advantages hereinbefore stated, it will be realized that it is capable of considerable modification without departing from the spirit of the invention. For this reason, we do not mean to be limited to the form shown and described herein, but rather to the scope of the appended claims.

We claim:

1. In a slide film projector of the type in which a motion picture film is moved step by step through an optical system to sequentially project images thereon, film advancing mechanism including in combination: film guide means including a pair of pressure plates each having a pair of rails therein, said rails being in opposed parallel relation whereby to slidingly guide a motion picture film therebetween; means forming an optical aperture in at least one of said plates; a ratchet shaped tooth in one of said rails positioned and adapted to engage a perforation in said film upon retrograde motion thereof whereby to hold the latter with an image area thereon framed in said aperture, the rail opposite said tooth being relieved to permit said film to ride over said tooth during forward motion thereof; means adjacent an end of said guide means to hold said film in a free span whereby to permit said film to bow out of its normal path in said span; film advancing means including an actuating member reciprocable in the direction of said path and a claw member resiliently mounted on said actuating member and positioned and adapted upon a forward stroke of said actuating member to engage said film in said free span thereof and advance said film, said claw member being further adapted upon a rearward stroke of said actuating member to bend away from, and disengage said film; a solenoid connected to said actuating member whereby to reciprocate the same upon energization of said solenoid; and power impulse means including a condenser, a source of voltage to charge said condenser, switch means normally connecting said voltage source to said condenser and adapted to be moved to disconnect said condenser from said source and substantially simultaneously connect the same across said solenoid whereby to discharge said condenser through said solenoid to actuate the latter, and means to periodically actuate said switching means.

2. In photographic apparatus of the class described, film advancing mechanism comprising: gate means including opposed rails to slidably position a motion picture film in a path adjacent an optical aperture; index means fixed in said path adapted upon retrograde motion of said film to engage and hold the same in an indexed position with an image area thereon framed in said aperture; a fixed film guiding member adjacent an end of said path and spaced from said rails to hold said film in a free span unsupported across the entire width of said film whereby to permit the same to bow out of its normal path in said span; and reciprocating film advancing means having a stroke greater than the longitudinal separation of frames in said film, and having a perforation-engaging claw with forward and rearward surfaces relatively highly inclined to said film, said claw being connected to said reciprocating means by a resiliently yieldable member substantially parallel to said film whereby upon a forward stroke of said reciprocating means, said claw enters one of said perforations and advances said film to a point beyond said framing position, and upon a rearward stroke of said reciprocating means said claw remains in said perforation and moves said film in retrograde direction until said film engages said index member and thereafter said yieldable member bends to decrease the inclination of said rearward surface with respect to said film to permit said claw to disengage said perforation.

CARROLL H. DUNNING.
CARROLL DODGE DUNNING.

REFERENCES CITED

The following references are of record in the file of this patent:

UNITED STATES PATENTS

| Number | Name | Date |
|---|---|---|
| 1,153,110 | Jenkins | Sept. 7, 1915 |
| 1,444,884 | Pittman | Feb. 13, 1923 |
| 1,767,846 | Howell | June 24, 1930 |
| 1,923,855 | Victor | Aug. 22, 1933 |
| 1,930,723 | Mitchell | Oct. 17, 1933 |
| 1,939,332 | Bouwers et al. | Dec. 12, 1933 |
| 1,984,143 | Kraft | Dec. 11, 1934 |
| 2,025,361 | Skilling | Dec. 24, 1935 |
| 2,077,600 | Watson | Apr. 20, 1937 |
| 2,265,992 | Beck | Dec. 16, 1941 |
| 2,311,204 | Bouma | Feb. 16, 1943 |
| 2,395,600 | Weisglass | Feb. 26, 1946 |
| 2,423,562 | Lee | July 8, 1947 |
| 2,425,767 | Vang | Aug. 19, 1947 |

FOREIGN PATENTS

| Number | Country | Date |
|---|---|---|
| 229,243 | Great Britain | June 14, 1924 |
| 555,593 | Great Britain | Aug. 30, 1943 |